US007374195B1

(12) United States Patent
Varner et al.

(10) Patent No.: US 7,374,195 B1
(45) Date of Patent: May 20, 2008

(54) SEPARABLE WHEELCHAIR ASSEMBLY AND METHOD

(76) Inventors: Darrell D. Varner, 508 N. Shadydale Ave., West Covina, CA (US) 91790; Michael A. Sims, 508 N. Shadydale Ave., West Covina, CA (US) 91790

( * ) Notice: Subject to any disclaimer, the term of this patent is extended or adjusted under 35 U.S.C. 154(b) by 133 days.

(21) Appl. No.: 10/977,740

(22) Filed: Oct. 29, 2004

Related U.S. Application Data

(60) Provisional application No. 60/515,591, filed on Oct. 30, 2003.

(51) Int. Cl.
*B62B 11/00* (2006.01)

(52) U.S. Cl. ....................... 280/642; 280/649; 280/650

(58) Field of Classification Search ................ 280/638, 280/639, 642, 42, 647, 649, 650, 250.1
See application file for complete search history.

(56) References Cited

U.S. PATENT DOCUMENTS 4,371,183 A * 2/1983 Dion .......................... 280/42
4,415,177 A 11/1983 Hale et al.
4,493,488 A * 1/1985 Panaia et al. ................. 280/42
4,542,918 A 9/1985 Singleton
4,629,246 A * 12/1986 Fulton ......................... 297/44
4,887,826 A 12/1989 Kanter
4,979,779 A * 12/1990 Williams .................... 297/465
5,568,933 A 10/1996 Mizuno
6,135,475 A * 10/2000 Brown et al. ............ 280/250.1
6,343,805 B1 2/2002 Roy
6,889,993 B2 * 5/2005 Chen et al. ................. 280/287

* cited by examiner

*Primary Examiner*—Kevin Hurley
(74) *Attorney, Agent, or Firm*—Kenneth L Tolar

(57) ABSTRACT

A collapsible wheelchair assembly includes left and right frame sections that are separably fastened using a slide tube assembly. The slide tube assembly is fastened to the frame section with locking pins that can be manually removed without tools. The design allows the right and left frame sections to be completely separated for transport and storage.

8 Claims, 3 Drawing Sheets

SEPARABLE WHEELCHAIR ASSEMBLY AND METHOD

CROSS REFERENCE TO RELATED APPLICATIONS

This application is entitled to the benefit of provisional application No. 60/515,591 filed on Oct. 30, 2003.

BACKGROUND OF THE INVENTION

The present invention relates to a uniquely designed wheelchair that can be quickly and easily separated into two sections for transport and storage.

DESCRIPTION OF THE PRIOR ART

The elderly, the infirm and others who have various physical disabilities often require a wheelchair for ambulation. Accordingly, it is often necessary to transport a wheelchair in a vehicle along with the patient. However, because wheelchairs are inherently bulky, storing them within a vehicle is difficult, if not impossible. Though some wheelchairs are partially collapsible, they still occupy a significant amount of storage space. A myriad of folding and collapsible wheelchairs exist in the prior art which are purportedly designed to facilitate transport and storage. For example, U.S. Pat. No. 4,415,177 issued to Hale et al. discloses a wheelchair including a folding backrest, a removable headrest, a set of rotatable foot pads, a set of rotatable arms and foldable handles.

U.S. Pat. No. 4,542,918 issued to Singleton discloses a foldable wheelchair including two side frames connected by a foldable linkage.

U.S. Pat. No. 4,887,826 issued to Kantner discloses a lightweight foldable wheelchair including a seat having a base and a back hingedly attached thereto whereby the back is foldable to overlie the base. A pair of large wheels are removably mounted to each of two ends of an axle.

U.S. Pat. No. 5,568,933 issued to Mizuno discloses a foldable wheelchair including a pair of parallel main frames connected to each other on a rear side via a detachable back support and on a front side via vertical foot plates. Large wheels and a seat plate are detachably coupled to the main frame. The large wheels can be removed from the wheelchair to pass through most doorways.

U.S. Pat. No. 6,343,805 issued to Roy discloses a folding wheelchair including a plurality of interconnecting folding sections allowing the wheelchair to be collapsed for transport and storage.

Though a variety of collapsible wheelchairs exist in the prior art, most include folding components that only minimally reduce the size of the wheelchair. The present invention provides a uniquely designed wheelchair that may be quickly separated into two sections without the need for tools, allowing it to be easily transported or stored.

SUMMARY OF THE INVENTION

The present invention relates to a collapsible wheelchair. The device comprises a left frame section and a right frame section. Each frame section has a lower rail with a front and a rear riser extending therefrom. The rear riser on each frame section extends to a height significantly greater than that of the front riser and includes a handle outwardly extending therefrom. Each frame section is mounted on a pair of wheels. A pair of crossbars are attached to the lower rails for supporting a seat member. Each crossbar includes an aperture on an intermediate portion thereof that removably receives a nut and bolt to join the two crossbars when the wheelchair is an expanded, operable configuration. Each crossbar includes a lower end having a sleeve thereon that receives one of the lower rails allowing the crossbar to pivot relative thereto. At an upper end of each crossbar is a seat support tube. A seat member includes two opposing edges, one of which is permanently attached to one of the seat support tubes. The other seat support tube includes a plurality of twist eyelets thereon that are removably received within mating apertures on the opposing edge of the seat member allowing the seat member to be detached. Each front riser includes an opening at a top end thereof that telescopically receives a slide tube having a horizontal sleeve at the upper end thereof. The sleeve removably receives the front end of the seat support tube. A plug is removably received within the opposing side of the sleeve and includes a bore for receiving a locking pin to lock the plug and seat support tube within the sleeve. The rear end of each seat support tube includes an opening that slidably receives an elongated arm having a C-shaped clamp member at an end thereof. The C-shaped clamp member encompasses the rear riser on the corresponding frame section further securing the seat support tube thereto.

It is therefore an object of the present invention to provide a wheelchair that can be easily separated into two sections for transport or storage.

It is therefore another object of the present invention to provide a wheelchair that can be collapsed or disassembled without the need for tools or assistance.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
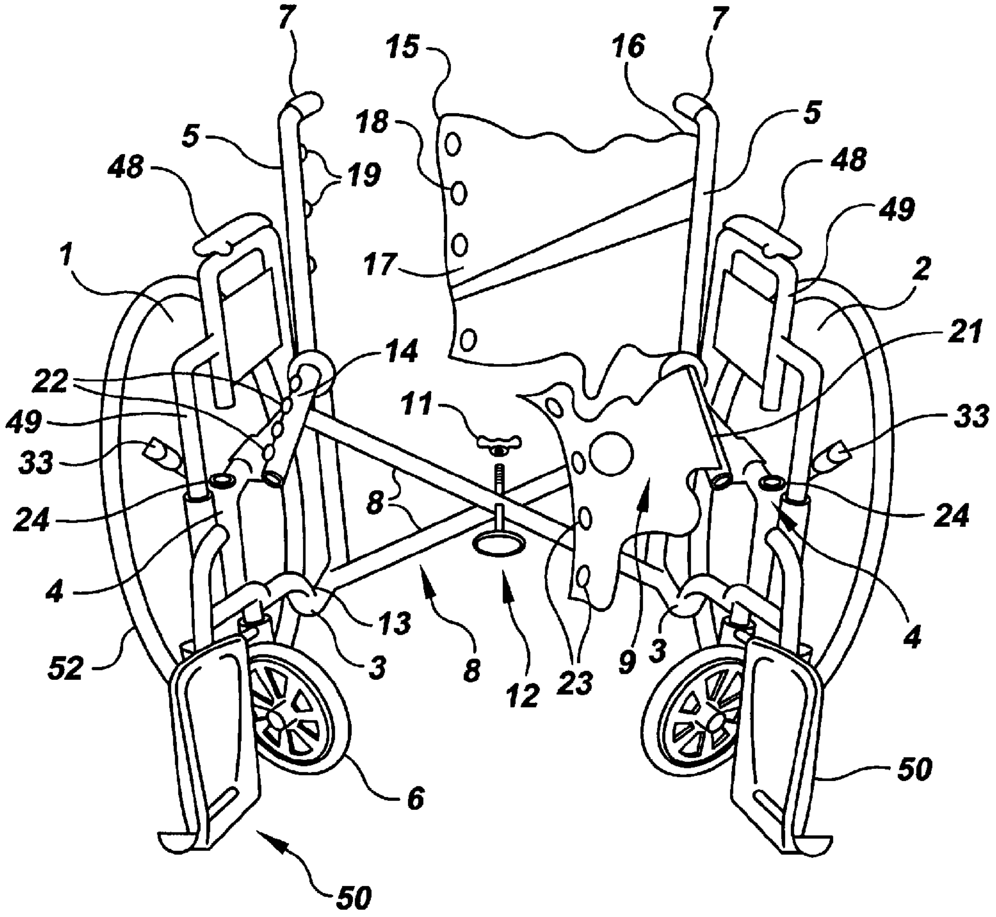
FIG. 1 is a perspective view of the wheelchair in a partially collapsed configuration.
Figure 2:
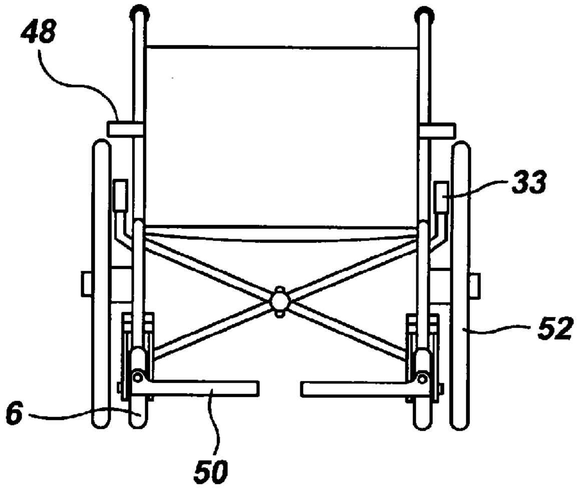
FIG. 2 is a front view of the wheelchair in an operable configuration.
Figure 3:
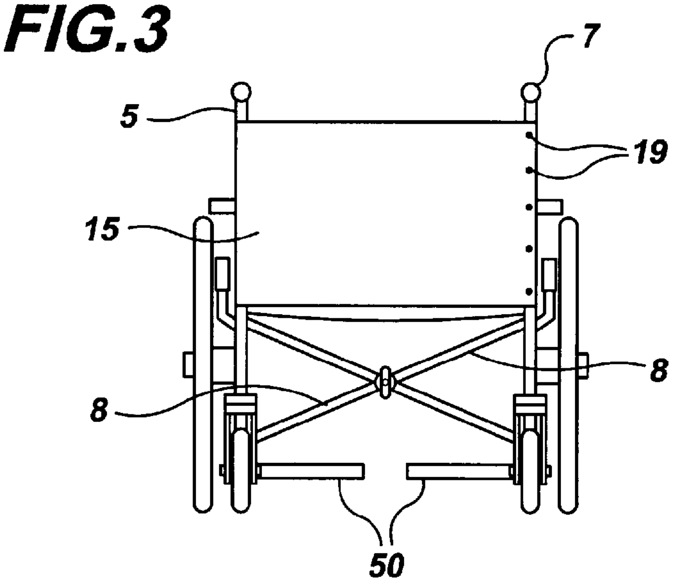
FIG. 3 is a rear view of the wheelchair in an operable configuration.
Figure 4:
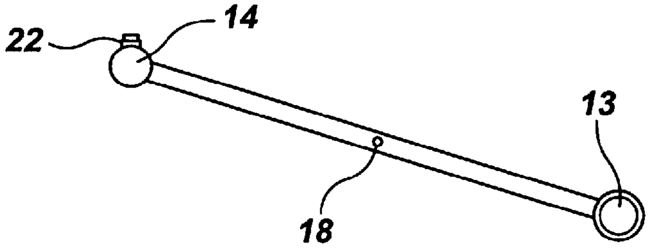
FIG. 4 is a side view of a crossbar according to the present invention.
Figure 5:
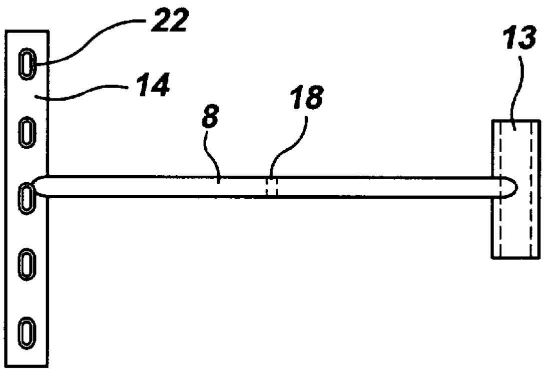
FIG. 5 is a top view of a crossbar according to the present invention.
Figure 6:
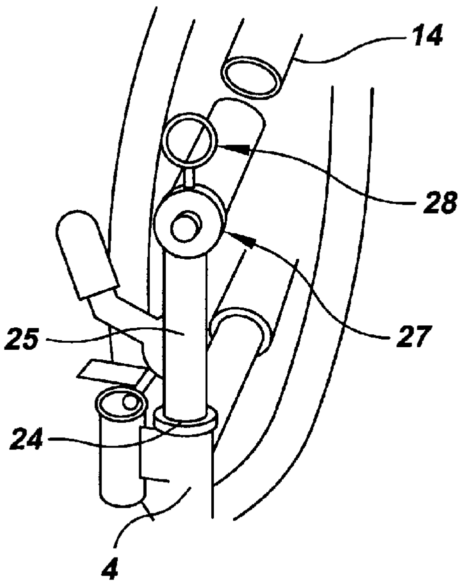
FIG. 6 is a detailed view of the slide tube assembly.
Figure 7:
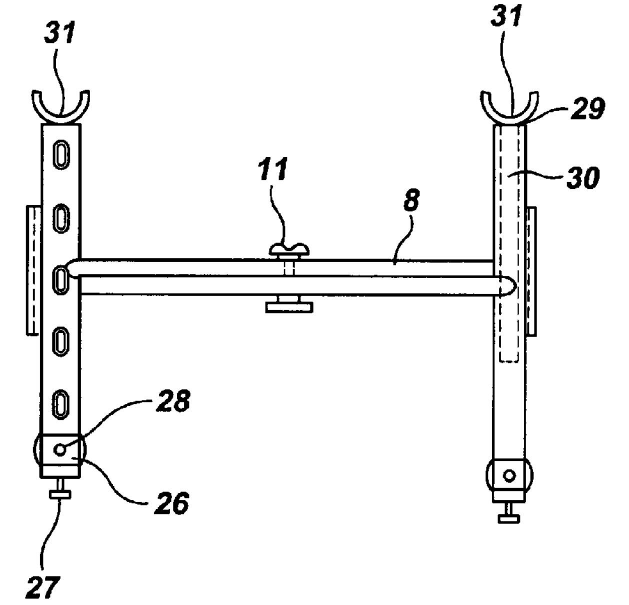
FIG. 7 is a top view of the slide tube assembly.
Figure 8:
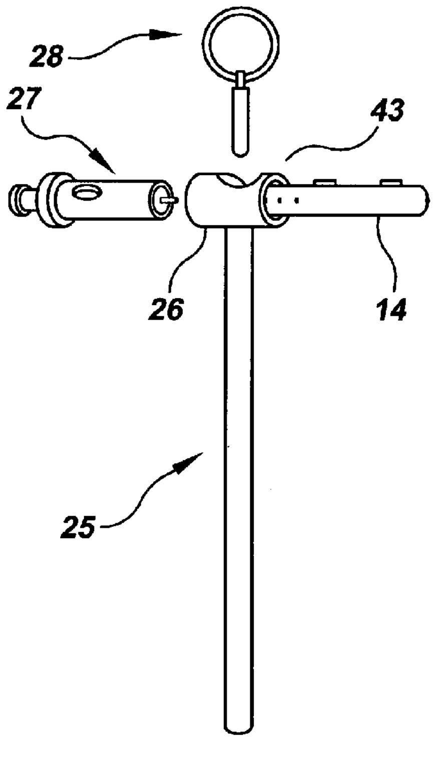
FIG. 8 is a detailed view of the tube and locking pin assembly.

The present invention relates to a separable wheelchair. The device comprises a left frame section 1 and a right frame section 2, each of which is mounted on a pair of wheels 6. A pair of handbrakes 33 selectively lock the wheels to prevent the wheelchair from rolling. Each frame section has a lower rail 3 with a front 4 and a rear 5 riser extending therefrom. The rear riser on each frame section extends to a height significantly greater than that of the front riser and includes a handle 7 outwardly extending therefrom. A backrest member 15 includes two opposing edges, one 16 of which is permanently fastened to a rear riser. The other edge 17 includes a plurality of apertures 18 for receiving mating twist eyelets 19 longitudinally disposed on the other rear riser.

A pair of intersecting crossbars 8 are attached to the lower rails for supporting a seat member 9. Each crossbar includes an aperture 10 on an intermediate portion thereof that removably receives a fastener such as a nut 11 and bolt 12 to fixedly join the two crossbars when the wheelchair is an expanded, operable position. Each crossbar includes a lower end having a sleeve 13 thereon that receives one of the lower rails allowing it to pivot relative thereto. At an upper end of each crossbar is a seat support tube 14.

The seat member 9 includes two opposing edges, one 21 of which is permanently attached to one of the seat support tubes. The other seat support tube includes a plurality of twist eyelets 22 thereon that are received within mating apertures 23 on the opposing edge of the seat member allowing the seat member to be detached.

Each seat support tube includes a front end that is removably secured to the front riser on each frame section with a slide tube assembly 43. The slide tube assembly includes a slide tube 25 having a horizontal sleeve 26 at the upper end thereof. Each slide tube is telescopically received within an opening 24 at a top end of each front riser. The sleeve removably receives the front end of the seat support tube at one end and a plug 27 within the opposing end. The plugs, sleeves and seat support tubes each include a bore for receiving a locking pin 28 to secure the plug and seat support tube within the sleeve. The rear end of each seat support tube includes an opening 29 that slidably receives an elongated arm 30 having a C-shaped clamp member 31 at a distal end thereof. The C-shaped clamp member encompasses the rear riser on the corresponding frame section.

Adjacent each frame member is a padded armrest 48 and armrest frame assembly 49 having a large diameter wheel 52 thereon. A pivotal footrest 50 is mounted on each frame member for enhanced comfort to the user.

The method of disassembling the above-described wheelchair for transport or storage is as follows. Each handbrake is applied to anchor the wheelchair. The seat and backrest members are partially collapsed by raising the seat member slightly. The twist eyelets on the rear riser and the corresponding seat support tube are unlocked and the seat and backrest members are detached. The left frame section is placed against a supporting surface and the crossbar fasteners are loosened, but not removed. The locking pin and plug are temporarily removed to release the seat support tube and then reinstalled. The elongated arms are detached from the rear risers and the crossbar fasteners are removed allowing the crossbars, and thus each frame section, to be separated. Each crossbar can then be folded against its respective frame section allowing each frame section to be separately and compactly stored.

The above described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A separable wheelchair comprising:

a pair of frame members, each of said frame members mounted on a wheel assembly, each frame member having a lower rail with a front riser and a rear riser extending therefrom;

a pair of crossbars each having a lower end with a sleeve thereon, each sleeve receiving one of said lower rails, each crossbar further having an upper end;

a seat support tube on the upper end of each crossbar, each seat support tube removably attached to one of said frame members;

a seat member having a fixed side and a free side, said fixed side being fixedly attached to one of said seat support tubes, said free side being removably attached to the other seat support tube.

2. The wheelchair according to claim 1 further comprising a backrest member having two opposing edges, one of said edges fixedly secured to one of said frame members, the other of said edges removably secured to the other of said frame members.

3. The wheelchair according to claim 2 further comprising means for securing each of said seat support tubes to one of said frame members.

4. The wheelchair according to claim 3 wherein said means for securing each of said seat support tubes to one of said frame members comprises:

an opening on a top end of each front riser;

a tube telescopically received within said opening, said tube having an upper end;

a horizontal sleeve at the upper end of each tube, said tube slidably receiving a portion of one of said seat support tubes;

a plug received within said sleeve, said sleeve, said plug and said front riser each having a bore thereon for simultaneously receiving a locking pin to secure said front riser within said sleeve.

5. The wheelchair according to claim 4 wherein means for securing each of said seat support tubes to one of said frame members further comprises:

an opening on a rear end of each of said seat support tubes;

an elongated arm slidably received within each opening on the rear end of each seat support tube, each arm having a clamp member at a distal end thereof, each clamp member encompassing one of said rear risers.

6. The wheelchair according to claim 1 wherein the free side of said seat member includes a plurality of apertures adjacent thereto, each of said apertures removably receiving twist eyelets on said other of said seat support tubes.

7. A separable wheelchair comprising:

a pair of side frame members, each of said frame members mounted on a wheel assembly;

a seat support assembly interconnecting said side frame members, said seat support assembly separable from either of said frame members;

a seat member fixedly attached to a side of said seat support assembly and removably attached to another side of said seat support assembly whereby said frame members are separable for transport and storage;

a backrest member fixedly attached to one of said frame members and removably attached to the other of said frame members.

8. The wheelchair assembly according to claim 7 wherein said seat support assembly includes a pair of intersecting crossbars each having a lower end secured to one of said frame members and an upper end secured to said seat member and to one of said frame members.

* * * * *